(12) United States Patent
Lin (10) Patent No.: US 11,657,001 B2
(45) Date of Patent: May 23, 2023

(54) DATA STORAGE DEVICE AND CONTROL METHOD OF ADDRESS MANAGEMENT USING MAPPING TABLES

(71) Applicant: Silicon Motion, Inc., Jhubei (TW)

(72) Inventor: Sheng-Hsun Lin, Magong (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 17/584,753

(22) Filed: Jan. 26, 2022

(65) Prior Publication Data

US 2022/0269618 A1 Aug. 25, 2022

(30) Foreign Application Priority Data

Feb. 25, 2021 (TW) ................................ 110106679

(51) Int. Cl.
*G06F 12/1009* (2016.01)

(52) U.S. Cl.
CPC .... *G06F 12/1009* (2013.01); *G06F 2212/651* (2013.01); *G06F 2212/7201* (2013.01)

(58) Field of Classification Search
CPC ........... G06F 12/1009; G06F 2212/651; G06F 2212/7201
See application file for complete search history.

(56) References Cited

U.S. PATENT DOCUMENTS

| | | | |
|---|---|---|---|
| 2009/0100429 A1* | 4/2009 | Thoelke | G06F 12/126 718/102 |
| 2013/0151754 A1 | 6/2013 | Post et al. | |
| 2015/0067232 A1* | 3/2015 | Fontana | G06F 12/0253 711/103 |
| 2017/0255383 A1 | 9/2017 | Chang et al. | |
| 2019/0227926 A1* | 7/2019 | Ke | G06F 12/0246 |
| 2020/0110698 A1* | 4/2020 | Kanno | G06F 3/0608 |
| 2020/0250099 A1 | 8/2020 | Campbell et al. | |
| 2020/0310801 A1 | 10/2020 | Dechene et al. | |

FOREIGN PATENT DOCUMENTS

| | | | |
|---|---|---|---|
| TW | 201346553 A | 11/2013 | |
| TW | 202046333 A | 12/2020 | |

* cited by examiner

*Primary Examiner* — Chie Yew
(74) *Attorney, Agent, or Firm* — McClure, Qualey & Rodack, LLP (57) ABSTRACT

A management technology for mapping data of a non-volatile memory is shown. A controller establishes a first mapping table and a second mapping table. By looking up the first mapping table, the controller maps a first logical address issued by the host for data reading to a first block substitute. By looking up the second mapping table, the controller maps the first block substitute to a first physical block of the non-volatile memory. The first mapping table further records a first offset for the first logical address. According to the first offset recorded in the first mapping table, the first logical address is mapped to a first data management unit having the first offset in the first physical block represented by the first block substitute.

20 Claims, 6 Drawing Sheets

FIG. 1

| Logical Addr. | (block substitute, offet) | | | | |
|---|---|---|---|---|---|
| ... | ... | ... | ... | ... | ... |
| 0x3000 | (MBlk 0x0A, Unit 0x00) | ... | (MBlk 0x0A, Unit 0x01) | ... | (MBlk 0x0A, Unit 0x02) |
| 0x3004 | ... | ... | ... | ... | ... |
| 0x3008 | | | | | |
| 0x300A | | | | | |
| ... | ... | ... | ... | ... | ... |

202

| FBlk | MBlk |
|---|---|
| 0x00 | 0x00 |
| 0x01 | 0x0B |
| ... | ... |
| 0x0A | 0x0A → 0x01 |
| 0x0B | 0x01 → 0x0A |
| ... | ... |

204

| MBlk | FBlk |
|---|---|
| 0x00 | 0x00 |
| 0x01 | 0x0B → 0x0A |
| ... | ... |
| 0x0A | 0x0A → 0x0B |
| 0x0B | 0x01 |
| ... | ... |

DATA STORAGE DEVICE AND CONTROL METHOD OF ADDRESS MANAGEMENT USING MAPPING TABLES

CROSS REFERENCE TO RELATED APPLICATIONS

This application claims priority of Taiwan Patent Application No. 110106679, filed on Feb. 25, 2021, the entirety of which is incorporated by reference herein.

BACKGROUND OF THE INVENTION

Field of the Invention

The present invention relates to mapping information management of data storage devices.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Non-volatile memory usually has special storage characteristics. In this technical field, control technologies based on the special storage characteristics of non-volatile memory are being developed. For example, mapping information management for a non-volatile memory should be developed based on the storage characteristics of the non-volatile memory.

BRIEF SUMMARY OF THE INVENTION

This case proposes a mapping information management technology for non-volatile memory.

An data storage device in accordance with an exemplary embodiment of the present invention comprises a non-volatile memory and a controller. The controller is coupled to the non-volatile memory, and configured to operate the non-volatile memory as requested by a host. The controller establishes a first mapping table and a second mapping table. By looking up the first mapping table, the controller maps a first logical address issued by the host for data reading to a first block substitute. By looking up the second mapping table, the controller maps the first block substitute to a first physical block of the non-volatile memory. The first mapping table further records a first offset for the first logical address. According to the first offset recorded in the first mapping table, the first logical address is mapped to a first data management unit having the first offset in the first physical block represented by the first block substitute.

In an exemplary embodiment, the first mapping table lists a block substitute as well as an offset for each logical address, to be looked up according to a logical address index. The second mapping table records mapping information between block substitutes and physical blocks.

In an exemplary embodiment, when a whole block of data is moved from the first physical block to a second physical block on the non-volatile memory, the controller modifies the second mapping table to change to use the first block substitute to represent the second physical block.

In an exemplary embodiment, when the whole block of data is moved from the first physical block to the second physical block, the controller further modifies the second mapping table to map a second block substitute originally representing the second physical block to the first physical block.

In an exemplary embodiment, when the host requests to read the first logical address after the whole block of data has been moved from the first physical block to the second physical block, the controller looks up the first mapping table to obtain the first block substitute and the first offset related to the first logical address, looks up the second mapping table to obtain the second physical block represented by the first block substitute, and then maps a second data management unit having the first offset in the second physical block to the first logical address and uses the second data management unit to answer the host.

In an exemplary embodiment, the controller moves the whole block of data from the first physical block to the second physical block during a power recovery procedure.

In an exemplary embodiment, after the power recovery procedure, if interrupted programming is resumed to write data of a second logical address to the second physical block, the controller looks up the second mapping table to obtain information indicating that the second physical block is represented by the first block substitute, and records in the first mapping table that the second logical address is related to the first block substitute and a second offset, to map the second logical address to a third data management unit having the second offset in the second physical block represented by the first block substitute.

In an exemplary embodiment, the second mapping table includes a substitute-to-physical mapping table, and a physical-to-substitute mapping table. The substitute-to-physical mapping table lists physical blocks represented by different block substitutes, to be looked up according to a block substitute index. The physical-to-substitute mapping table lists block substitutes representing different physical blocks, to be looked up according to a physical block index.

In an exemplary embodiment, the second mapping table lists physical blocks represented by different block substitutes, to be looked up according to a block substitute index. By scanning entries of the second mapping table, the controller obtains a block substitute representing a target physical block.

In an exemplary embodiment, the second mapping table lists block substitutes representing different physical blocks, to be looked up according to a physical block index. By scanning entries of the second mapping table, the controller obtains a physical block represented by a target block substitute.

The controller operating the non-volatile memory may be implemented by other architectures. The forgoing concept may be used to realize a non-volatile memory control method.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example but not intended to limit thereto.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics which are described below.

The host side distinguishes data by logical addresses (for example, logical block addresses LBAs or global host page numbers GHPs). Mapping data is dynamically updated to map the logical addresses to the physical space of the flash memory.

The physical space of a flash memory is divided into a plurality of blocks to be allocated for data storage.

Figure 1:
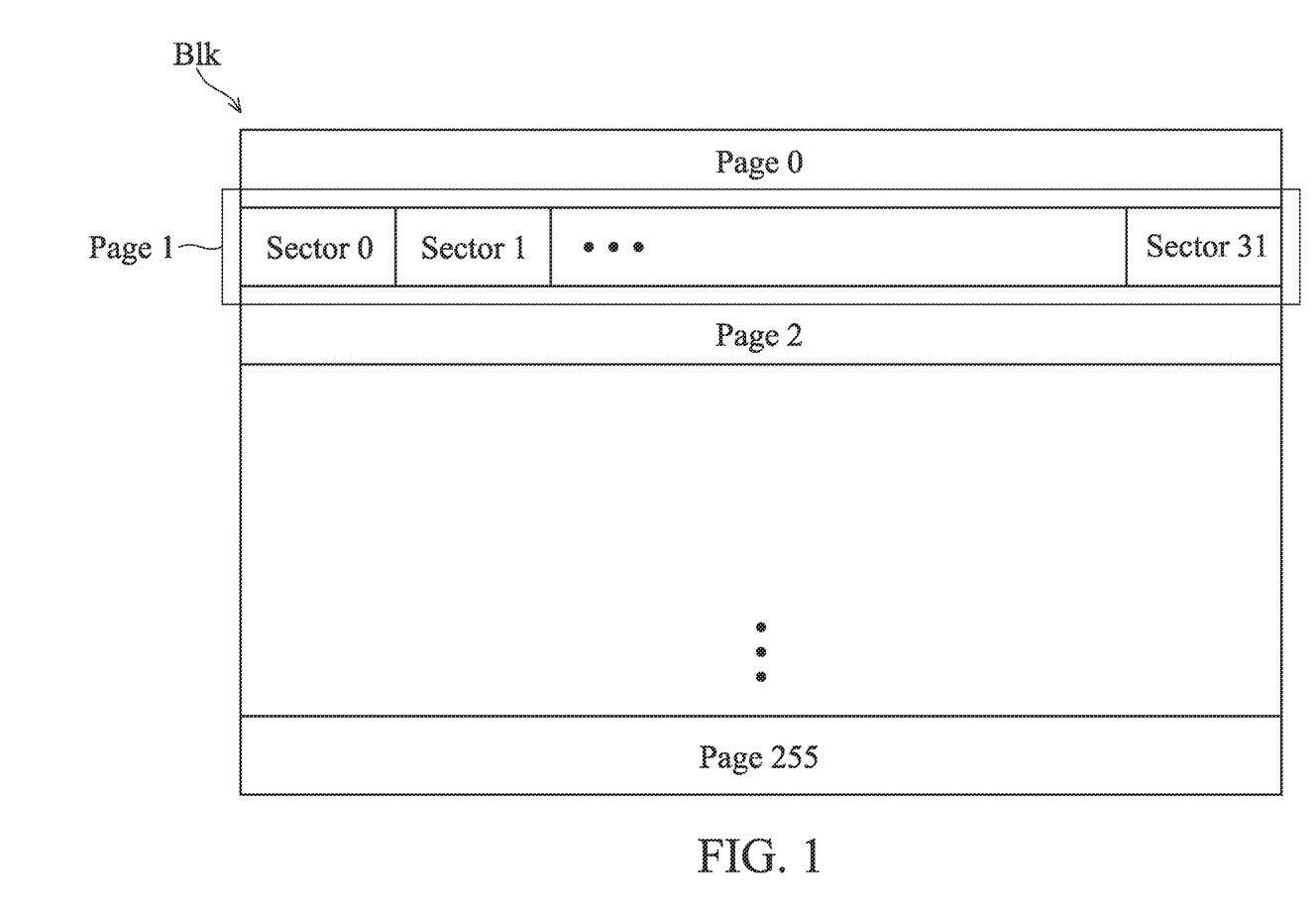
FIG. 1 illustrates the architecture of one block BLK.

FIG. 1 illustrates the architecture of one block BLK. The storage units may have various sizes dependent on the applications.

As shown, one block BLK includes a plurality of pages (e.g., page 0 to page 255). Each page includes a plurality of sectors (e.g., 32 sectors per page), and each sector may store 512B user data. Thus, each page may provide 16 KB of storage space. In an exemplary embodiment, the block Blk is allocated from the low numbered page to the high numbered page for data storage. Each page can be divided into a plurality of data management units. Taking the 4 KB data management mode as an example, the size of each data management unit is 4 KB (8 sectors). There are four data management units (4×4 KB) on each page.

In an exemplary embodiment, one sector (512B) is responsible for the storage of data of one logical block address LBA. A 4 KB data management unit (including eight sectors) corresponds to the data storage of eight consecutive logical block addresses LBAs (which is managed by one global host page number GHP). The mapping relationship between the logical addresses (whether GHPs, LBAs, or even others) and the physical space of the flash memory is generally recorded as a logical-to-physical mapping table (usually named L2P). For example, an L2P table may list the physical location (at which physical block and at which data management unit) of data of each logical address (LBA, GHP, and even others). The physical location may be indicated by a physical block (FBlk) number and an offset value.

The L2P table needs to be dynamically updated. The update of the L2P table involves the following steps: downloading the mapping information from the flash memory to the controller memory (for example, a random access memory, SRAM or DRAM or others); updating the mapping information on the controller memory; and, sealing the updated mapping information back to the flash memory. Such a mapping table update procedure consumes system resources considerably. If the number of updates to the mapping table can be reduced, system performance can be significantly improved.

Taking a power failure event as an example, the electrical properties of the programming interrupted block will be affected. In the power recovery procedure, the whole block of data of the programming interrupted block has to be moved to another block which involves an update of the L2P table, and affects the system performance considerably.

A mapping information management solution is proposed in the present invention, which is particularly beneficial to moving a whole block of data, and only involves a small amount of mapping information update. In an exemplary embodiment of the present invention, each physical block FBlk is represented by a block substitute MBlk. The block substitutes MBlks for the different physical blocks FBlks are listed in a physical-to-substitute (FBlk-MBlk) mapping table, and the reverse table, a substitute-to-physical (MBlk-FBlk) mapping table is also proposed. Unlike using the traditional logical-to-physical mapping table L2P, the mapping information between the logical addresses and the physical blocks are managed by a logical-to-substitute (L2M) mapping table, a physical-to-substitute (FBlk-MBlk) mapping table, and a substitute-to-physical (MBlk-FBlk) mapping table proposed in the present invention.

Figure 2:
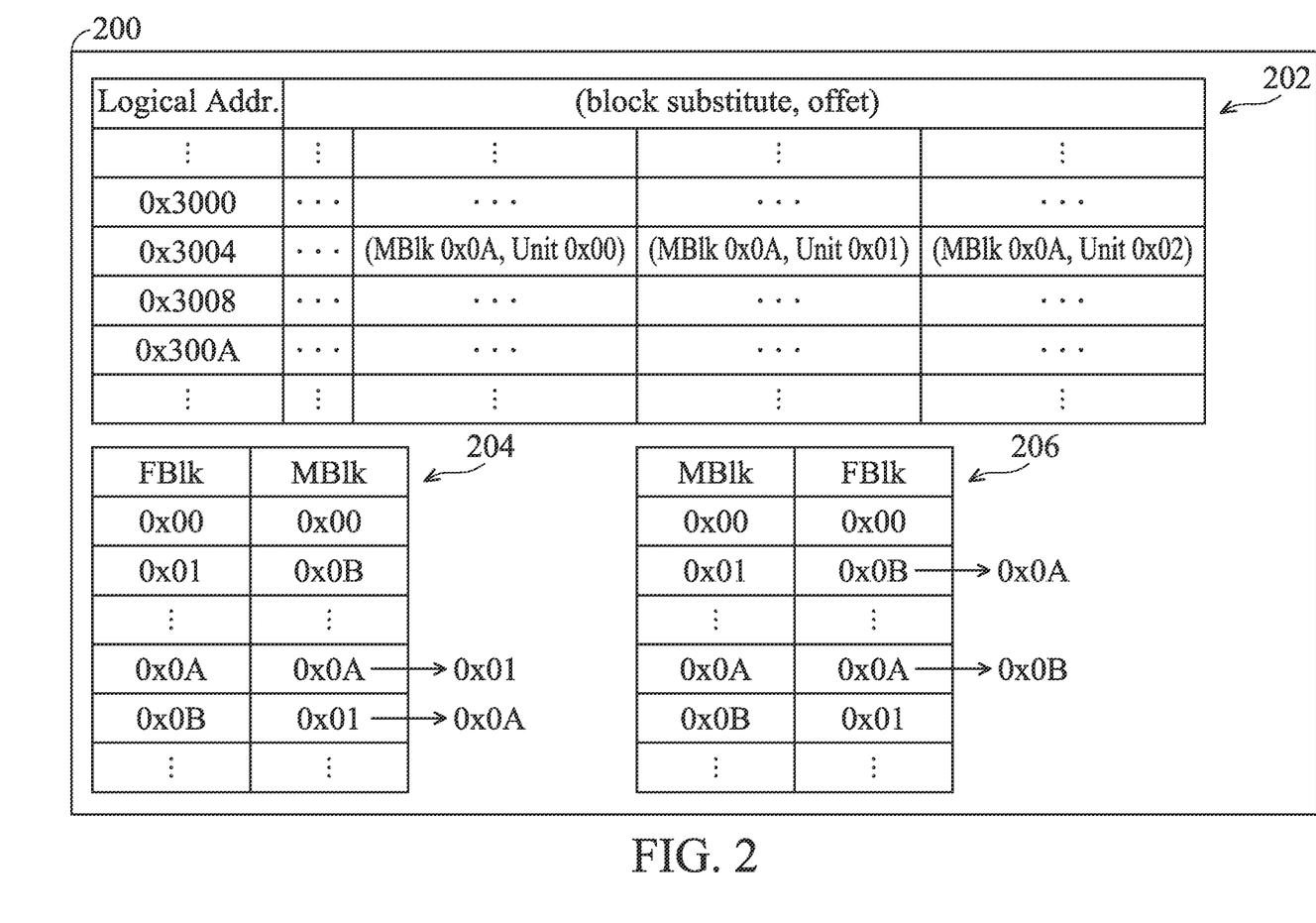
FIG. 2 illustrates a mapping information management architecture 200 in accordance with an exemplary embodiment of the present invention, which includes a logical-to-substitute (L2M) mapping table 202, a physical-to-substitute (FBlk-MBlk) mapping table 204, and a substitute-to-physical (MBlk-FBlk) mapping table 206.

FIG. 2 illustrates a mapping information management architecture 200 in accordance with an exemplary embodiment of the present invention, which includes a logical-to-substitute (L2M) mapping table 202, a physical-to-substitute (FBlk-MBlk) mapping table 204, and a substitute-to-physical (MBlk-FBlk) mapping table 206. The logical-to-substitute (L2M) mapping table 202 lists the block substitute MBlk that each logical address is mapped to, and further records the data management unit number Unit # related to each logical address. The data management unit number Unit # can be regarded as an offset to search in the corresponding physical block. The logical-to-substitute (L2M) mapping table 202 shows that the logical address 0x3005 is related to (MBlk 0x0A, Unit 0x00), the logical address 0x3006 is related to (MBlk 0x0A, Unit 0x01), and the logical address 0x3007 is related to (MBlk 0x0A, Unit 0x02). The substitute-to-physical (MBlk-FBlk) mapping table 206 shows that the block substitute MBlk 0x0A is mapped to a physical block FBlk 0x0A. Therefore, the information provided by the logical-to-substitute (L2M) mapping table 202 and the substitute-to-physical (MBlk-FBlk) mapping table 206 is: the logical address 0x3005 is mapped to the data management unit 0x00 of the physical block FBlk 0x0A; the logical address 0x3006 is mapped to the data management unit 0x01 of the physical block FBlk 0x0A; and the logical address 0x3007 is mapped to the data management unit 0x02 of the physical block FBlk 0x0A. The physical-to-substitute (FBlk-MBlk) mapping table 204 is a reverse table of the substitute-to-physical (MBlk-FBlk) mapping table 206. As shown in the physical-to-substitute (FBlk-MBlk) mapping table 204, the physical block FBlk 0x0A is mapped to the block substitute MBlk 0x0A, complying with the mapping relationship recorded in the substitute-to-physical (MBlk-FBlk) mapping table 206.

When a whole block of data is moved, update on the physical-to-substitute (FBlk-MBlk) mapping table 204 and the substitute-to-physical (MBlk-FBlk) mapping table 206 is required. In the following example, the whole block of data of the physical block FBlk 0x0A is moved to another physical block FBlk 0x0B. The physical-to-substitute (FBlk-MBlk) mapping table 204 is revised. As shown, the physical block FBlk 0x0A is originally represented by the block substitute MBlk 0x0A. After moving the whole block of data from the physical block FBlk 0x0A to the physical block FBlk 0x0B, the physical-to-substitute (FBlk-MBlk) mapping table 204 is revised to map the physical block FBlk 0x0B to the block substitute MBlk 0x0A. As for the block substitute MBlk 0x01 originally representing the physical block FBlk 0x0B, it is changed to represent the physical block FBlk 0x0A. A block swapping is achieved. As shown, the physical block FBlk 0x0A originally represented by the block substitute MBlk 0x0A is changed to be represented by the block substitute MBlk 0x01, and the physical block FBlk 0x0B originally represented by the block substitute MBlk 0x01 is changed to be represented by the block substitute MBlk 0x0A.

Referring to the substitute-to-physical (MBlk-FBlk) mapping table 206 (the reversed table of 204), the block substitute MBlk 0x01 no longer represents the physical block FBlk 0x0B, and is changed to represent the physical block FBlk 0x0A. Furthermore, the block substitute MBlk 0x0A no longer represents the physical block FBlk 0x0A, and is changed to represent the physical block FBlk 0x0B.

When a whole block of data is moved, no modification on the huge logical-to-substitute (L2M) mapping table 202 is required. The system resources are greatly saved.

The logical-to-substitute (L2M) mapping table 202, the physical-to-substitute (FBlk-MBlk) mapping table 204, and the substitute-to-physical (MBlk-FBlk) mapping table 206 are stored in the flash memory for non-volatile storage, and are only read out from the flash memory as a reference or to be updated.

Figure 3:
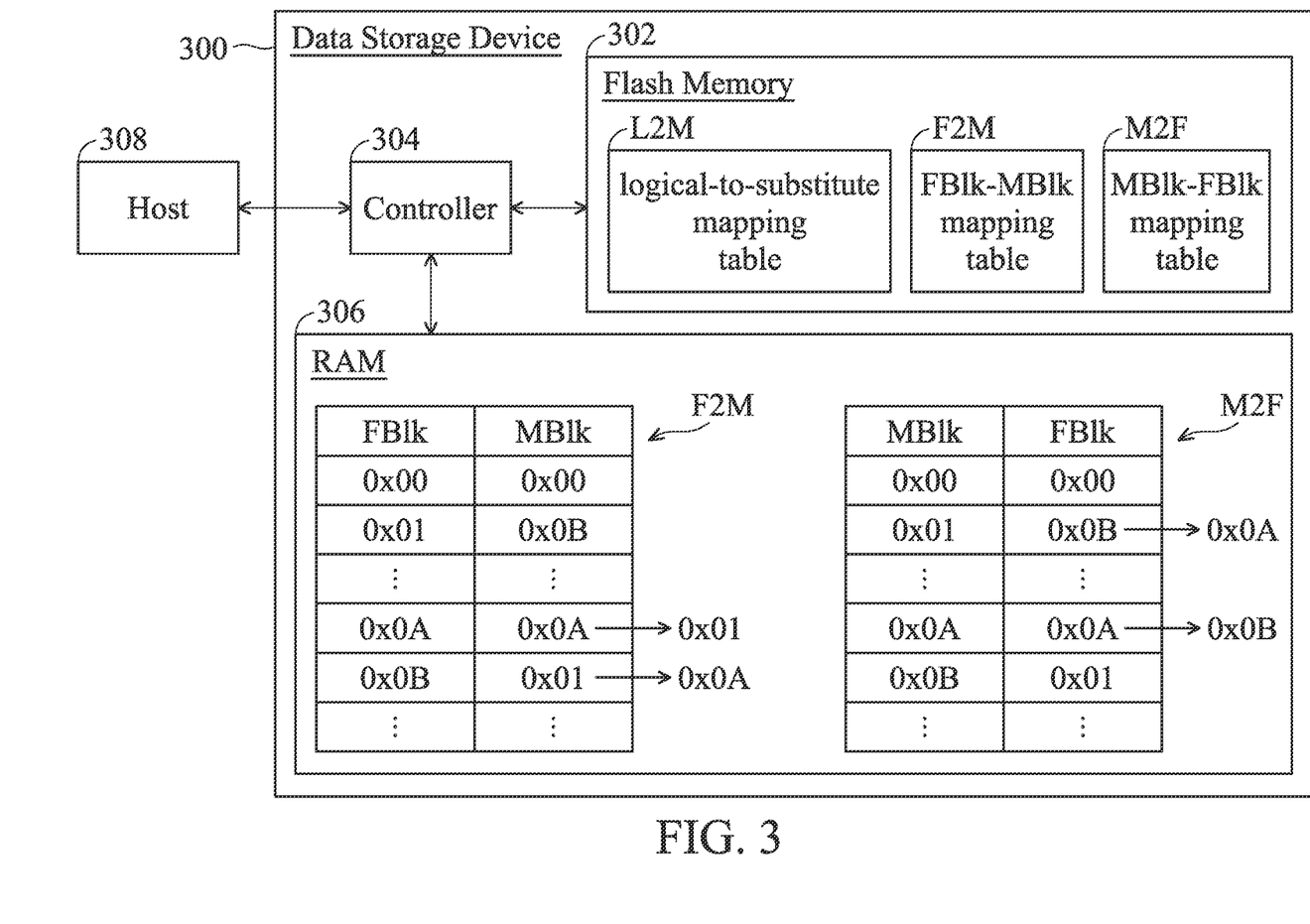
FIG. 3 illustrates a data storage device 300 in accordance with an exemplary embodiment of the present invention.

FIG. 3 illustrates a data storage device 300 in accordance with an exemplary embodiment of the present invention, which includes a flash memory 302, a controller 304, and a random access memory 306. The random access memory (RAM) 306 may be a static random access memory (SRAM), a dynamic random access memory (DRAM), or other storage devices that the controller 204 can access at a high speed. In another exemplary embodiment, a system memory at the host 308 side is used to replace the random access memory 306. The host 308 operates the flash memory 302 through the controller 304. The controller 304 temporarily stores data in the random access memory 306 when performing operations. FIG. 3 further shows an example of block swapping.

A logical-to-substitute mapping table L2M, physical-to-substitute (FBlk-MBlk) mapping table F2M, and substitute-to-physical (MBlk-FBlk) mapping table M2F are stored in the flash memory for non-volatile storage. When performing block swapping, the controller 304 loads the physical-to-substitute (FBlk-MBlk) mapping table F2M and substitute-to-physical (MBlk-FBlk) mapping table M2F from the flash memory 302 to the random access memory 306 to be updated on the random access memory 306. FIG. 3 depicts how the physical-to-substitute (FBlk-MBlk) mapping table F2M and the substitute-to-physical (MBlk-FBlk) mapping table M2F are updated when the whole block of data is moved from the physical block FBlk 0x0A to the physical block FBlk 0x0B.

In addition, the design of the logical-to-substitute mapping table L2M is discussed.

With the progress of the manufacturing process, the size of flash memory is getting larger and larger. For a 4 TB flash memory, its logical-to-substitute mapping table L2M is up to 4 GB. For an 8 TB flash memory, its logical-to-substitute mapping table L2M is up to 8 GB. The loading and updating of the excessively large logical-to-substitute mapping table L2M consumes system resources considerably.

One solution is to divide the logical-to-substitute mapping table L2M into smaller-sized sub-tables; e.g., sub-tables L2M_G # corresponding to the different logical address groups G # (# is a number). Only the called sub-table L2M_G # is loaded for reference or update. Compared with the complete logical-to-substitute mapping table L2M, the loading of just one sub-table L2M_G # only consumes a small amount of system resources.

Figure 4:
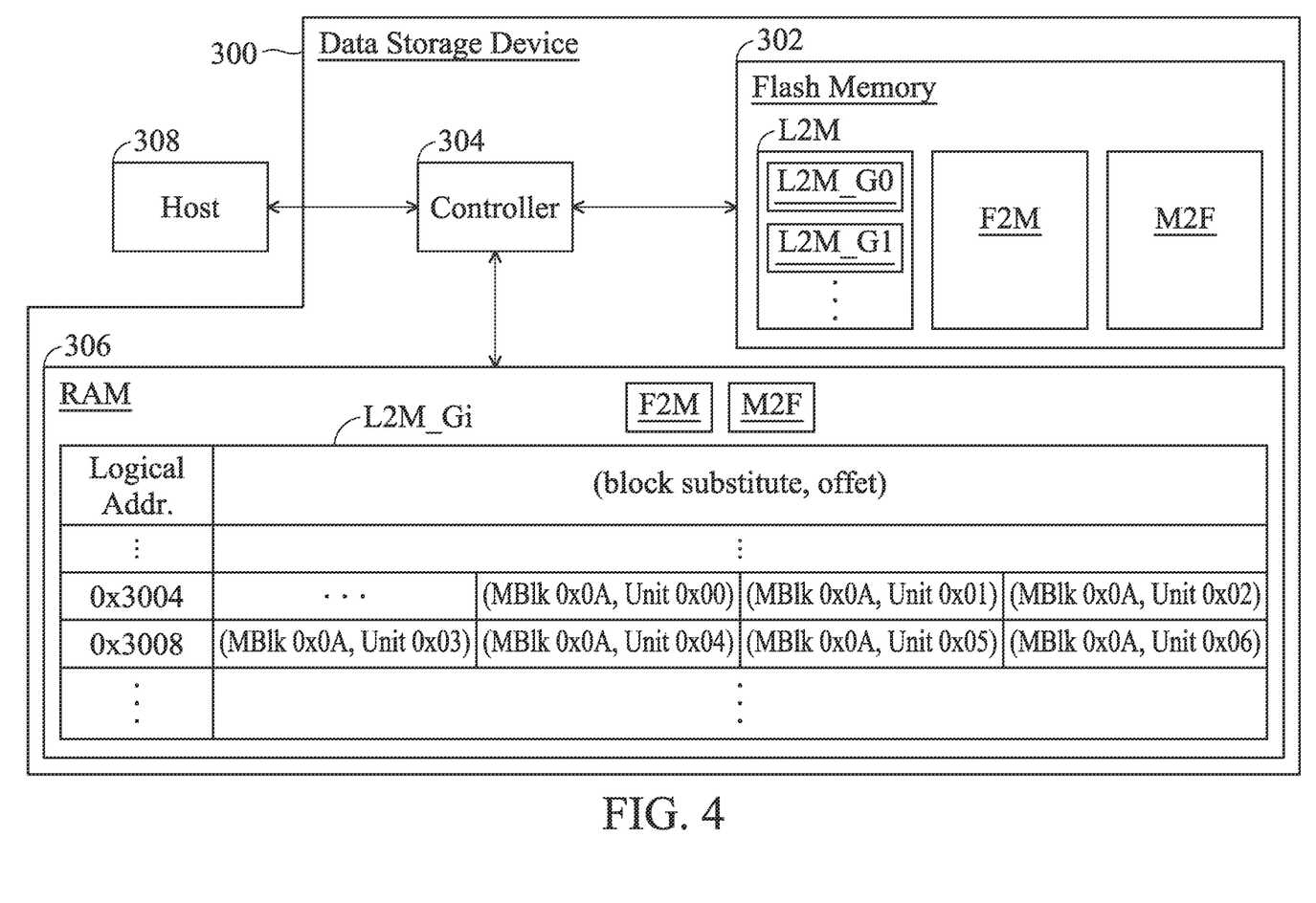
FIG. 4 illustrates an example of resuming the interrupted programming during a power recovery procedure.

FIG. 4 illustrates an example of resuming the interrupted programming during a power recovery procedure. In this example, the programming is interrupted at logical address 0x3007 because of power failure. The logical address 0x3007 is mapped to a block substitute MBLK 0x0A and the related data management unit is Unit 0x02. The sub-table corresponding to the logical address 0x3007 is L2M_Gi. As shown in FIG. 3, in the power recovery procedure, the whole block of data of the physical block FBlk 0x0A is moved to the physical block FBlk 0x0B, and update is performed on the physical-to-substitute (FBlk-MBlk) mapping table F2M and substitute-to-physical (MBlk-FBlk) mapping table M2F. FIG. 4 further shows that the sub-table L2M_Gi is loaded onto the random access memory 306 to be updated as the interrupted programming is resumed.

When the power is recovered, the resumed programming is performed on the physical block FBlk 0x0B (the destination block of the block moving performed during the power recovery procedure). The controller 304 consults (looks up) the physical-to-substitute (FBlk-MBlk) mapping table F2M and thereby obtains that the physical block FBlk 0x0B now is represented by the block substitute MBlk 0x0A. When the resumed programming starting from the logical address 0x3008, the write data of the logical address 0x3008 should be programmed into the space following that indicated by (MBlk 0x0A, Unit 0x02). The data of logical address 0x3008 is programmed into the space indicated by (MBlk 0x0A, Unit 0x03), which is unit 0x03 of the physical block FBlk 0x0B. The data of logical address 0x3009 is programmed into the space indicated by (MBlk 0x0A, Unit 0x04), which is unit 0x04 of the physical block FBlk 0x0B. The data of logical address 0x3010 is programmed into the space indicated by (MBlk 0x0A, Unit 0x05), which is unit 0x05 of the physical block FBlk 0x0B. The data of logical address 0x3011 is programmed into the space indicated by (MBlk 0x0A, Unit 0x06), which is unit 0x06 of the physical block FBlk 0x0B. The resumed programming correctly programs data into the physical block FBlk 0x0B.

Figure 5:
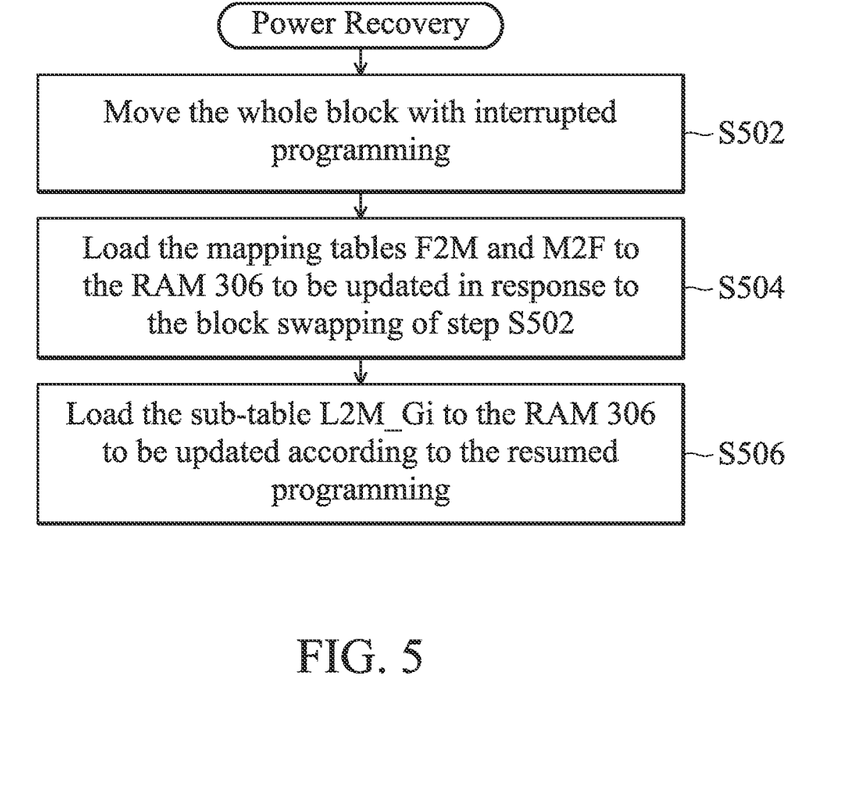
FIG. 5 is a flowchart illustrating a power recovery procedure in accordance with an exemplary embodiment of the present invention.

FIG. 5 is a flowchart illustrating a power recovery procedure in accordance with an exemplary embodiment of the present invention. In step S502, the whole block with interrupted programming is moved, e.g., moving the whole block of data from the physical block FBlk 0x0A to the physical block FBlk 0x0B. In step S504, the physical-to-substitute (FBlk-MBlk) mapping table F2M and substitute-to-physical (MBlk-FBlk) mapping table M2F are loaded to the random access memory 306 to be updated in response to the block swapping of step S502. As discussed in the forgoing example, the physical block FBlk 0x0B is changed to be represented by the block substitute MBlk 0x0A, and the block substitute MBlk 0x01 originally representing the physical block FBlk 0x0B can be changed to represent the physical block FBlk 0x0A. In step S506, the sub-table L2M_Gi is loaded to the random access memory 306 to be updated according to the resumed programming.

Figure 6:
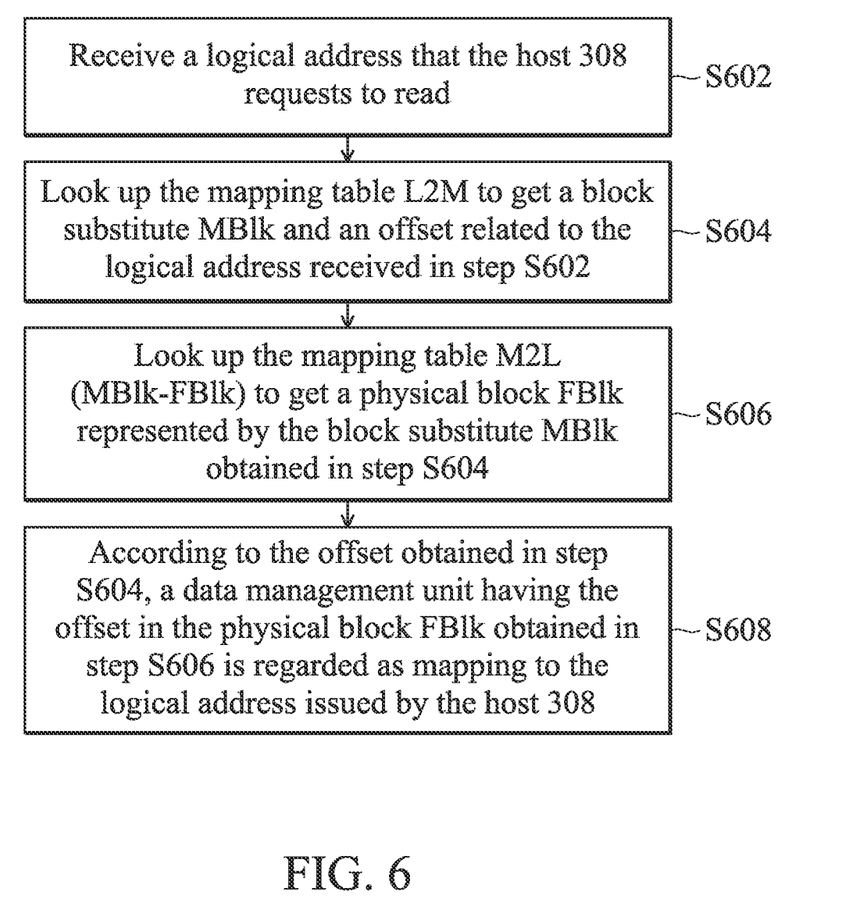
FIG. 6 is a flowchart illustrating a read operation of the flash memory 302 in accordance with an exemplary embodiment of the present invention.

FIG. 6 is a flowchart illustrating a read operation of the flash memory 302 in accordance with an exemplary embodiment of the present invention. In step S602, a logical address that the host 308 requests to read is received. Step S604 looks up the logical-to-substitute mapping table L2M to get a block substitute MBlk and an offset related to the logical address received in step S602. Step S606 looks up the substitute-to-logical (MBlk-FBlk) mapping table M2L to get a physical block FBlk represented by the block substitute MBlk obtained in step S604. In step S608, according to the offset obtained in step S604, a data management unit having the offset in the physical block FBlk obtained in step S606 is regarded as mapping to the logical address issued by the host 308. Data in the obtained data management unit is returned the host 308 to answer the read request.

In the example shown in FIG. 4, after moving data from the physical block FBlk 0x0A to the physical block FBlk 0x0B (or even after resuming the interpreted programming on the physical block FBlk 0x0B), a read request issued by the host 308 for reading data of the logical address 0x3007 is answered as the following discussion. The controller 304 looks up the sub-table L2M_Gi that corresponds to the logical address 0x3007, and thereby obtains a block substitute MBlk 0x0A and an offset Unit 0x02 related to the logical address 0x3007. The controller 304 then looks up the substitute-to-physical (MBlk-FBlk) mapping table M2F and thereby obtains a physical block FBlk 0x0B that is represented by the block substitute MBlk 0x0A. The controller 304 maps the data management unit Unit 0x02 in the physical block FBlk 0x0B to the logical address 0x3007. Data read from the data management unit Unit 0x02 of the physical block FBlk 0x0B is returned the host 308 to answer the read request of the logical address 0x3007.

The foregoing implementation is based on two small tables: the substitute-to-physical (MBlk-FBlk) mapping table M2F and the physical-to-substitute (FBlk-MBlk) mapping table F2M. The two small tables record the two-way mapping between the physical blocks and the block substitutes. However, it is also feasible to use just one direction mapping table.

In an exemplary embodiment, the substitute-to-physical (MBlk-FBlk) mapping table M2F is provided without the physical-to-substitute (FBlk-MBlk) mapping table F2M. The substitute-to-physical (MBlk-FBlk) mapping table M2F lists physical blocks FBlks represented by different block substitutes MBlks (e.g., from the lower numbered MBlk to the higher numbered MBlk), to be looked up according to a block substitute (MBlk) index. When a reversed search (FBlk-to-MBlk) is required, the controller 304 can sequentially scan the contents of the substitute-to-physical (MBlk-FBlk) mapping table M2F to obtain a block substitute (MBlk) representing a target physical block (FBlk).

In an exemplary embodiment, the physical-to-substitute (FBlk-MBlk) mapping table F2M is provided without the substitute-to-physical (MBlk-FBlk) mapping table M2F. The physical-to-substitute (FBlk-MBlk) mapping table F2M lists blocks substitutes MBlks representing different physical blocks FBlks (e.g., from the lower numbered FBlk to the higher numbered FBlk), to be looked up according to a physical block (FBlk) index. When a reversed search (MBlk-to-FBlk) is required, the controller 304 can sequentially scan the contents of the physical-to-substitute (FBlk-MBlk) mapping table F2M to obtain a physical block (FBlk) represented by a target block substitute (MBlk).

The controller operating a non-volatile memory may be realized in the other hardware structures. All mapping information management technologies based on the aforementioned concepts fall within the scope of protection of this case. In this case, the aforementioned concept can be used to realize a control method for a non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, coupled to the non-volatile memory and configured to operate the non-volatile memory as requested by a host, wherein:
the controller establishes a first mapping table and a second mapping table;
according to the first mapping table, the controller maps a first logical address to a first block substitute;
according to the second mapping table, the controller maps the first block substitute to a first physical block of the non-volatile memory;
the first mapping table further records a first offset for the first logical address, wherein the first offset is separate from the first logical address; and
according to the first offset recorded in the first mapping table, the first logical address is mapped to a first data management unit having the first offset in the first physical block represented by the first block substitute.

2. The data storage device as claimed in claim 1, wherein:
the first mapping table lists a block substitute as well as an offset for each logical address, to be looked up according to a logical address index; and
the second mapping table records mapping information between block substitutes and physical blocks.

3. The device as claimed in claim 2, wherein:
when a whole block of data is moved from the first physical block to a second physical block on the non-volatile memory, the controller modifies the second mapping table to use the first block substitute to represent the second physical block.

4. The device as claimed in claim 3, wherein:
when the whole block of data is moved from the first physical block to the second physical block, the controller further modifies the second mapping table to map a second block substitute originally representing the second physical block to the first physical block.

5. The device as claimed in claim 3, wherein:
when the host requests to read the first logical address after the whole block of data has been moved from the first physical block to the second physical block, the controller looks up the first mapping table to obtain the first block substitute and the first offset related to the first logical address, looks up the second mapping table to obtain the second physical block represented by the first block substitute, and then maps a second data management unit having the first offset in the second physical block to the first logical address and uses the second data management unit to answer the host.

6. The device as claimed in claim 5, wherein:
the controller moves the whole block of data from the first physical block to the second physical block during a power recovery procedure.

7. The device as claimed in claim 6, wherein:
after the power recovery procedure, if interrupted programming is resumed to write data of a second logical address to the second physical block, the controller looks up the second mapping table to obtain information indicating that the second physical block is represented by the first block substitute, and records in the first mapping table that the second logical address is related to the first block substitute and a second offset, to map the second logical address to a third data management unit having the second offset in the second physical block represented by the first block substitute.

8. The device as claimed in claim 7, wherein:
the second mapping table includes a substitute-to-physical mapping table, and a physical-to-substitute mapping table;
the substitute-to-physical mapping table lists physical blocks represented by different block substitutes, to be looked up according to a block substitute index; and
the physical-to-substitute mapping table lists block substitutes representing different physical blocks, to be looked up according to a physical block index.

9. The device as claimed in claim 7, wherein:
the second mapping table lists physical blocks represented by different block substitutes, to be looked up according to a block substitute index; and
by scanning entries of the second mapping table, the controller obtains a block substitute representing a target physical block.

10. The device as claimed in claim 7, wherein:
the second mapping table lists block substitutes representing different physical blocks, to be looked up according to a physical block index; and
by scanning entries of the second mapping table, the controller obtains a physical block represented by a target block substitute.

11. A non-volatile memory control method, comprising:
operating a non-volatile memory as requested by a host, establishing a first mapping table and a second mapping table;
looking up the first mapping table to map a first logical address to a first block substitute; and
looking up the second mapping table to map the first block substitute to a first physical block of the non-volatile memory,
wherein the first mapping table further records a first offset for the first logical address, wherein the first offset is separate from the first logical address and, according to the first offset recorded in the first mapping table, the first logical address is mapped to a first data management unit having the first offset in the first physical block represented by the first block substitute.

12. The non-volatile memory control method as claimed in claim 11, wherein:
the first mapping table lists a block substitute as well as an offset for each logical address, to be looked up according to a logical address index; and
the second mapping table records mapping information between block substitutes and physical blocks.

13. The non-volatile memory control method as claimed in claim 12, further comprising:
when a whole block of data is moved from the first physical block to a second physical block on the non-volatile memory, modifying the second mapping table to the first block substitute to represent the second physical block.

14. The non-volatile memory control method as claimed in claim 13, further comprising:
when the whole block of data is moved from the first physical block to the second physical block, modifying the second mapping table to map a second block substitute originally representing the second physical block to the first physical block.

15. The non-volatile memory control method as claimed in claim 13, further comprising:
when the host requests to read the first logical address after the whole block of data has been moved from the first physical block to the second physical block, looking up the first mapping table to obtain the first block substitute and the first offset related to the first logical address, looking up the second mapping table to obtain the second physical block represented by the first block substitute, and then mapping a second data management unit having the first offset in the second physical block to the first logical address and using the second data management unit to answer the host.

16. The non-volatile memory control method as claimed in claim 15, moving the whole block of data from the first physical block to the second physical block during a power recovery procedure.

17. The non-volatile memory control method as claimed in claim 16, further comprising:
after the power recovery procedure, if interrupted programming is resumed to write data of a second logical address to the second physical block, looking up the second mapping table to obtain information indicating that the second physical block is represented by the first block substitute, and recording in the first mapping table that the second logical address is related to the first block substitute and a second offset, to map the second logical address to a third data management unit having the second offset in the second physical block represented by the first block substitute.

18. The non-volatile memory control method as claimed in claim 17, wherein:
the second mapping table includes a substitute-to-physical mapping table, and a physical-to-substitute mapping table;
the substitute-to-physical mapping table lists physical blocks represented by different block substitutes, to be looked up according to a block substitute index; and the physical-to-substitute mapping table lists block substitutes representing different physical blocks, to be looked up according to a physical block index.

19. The non-volatile memory control method as claimed in claim 17, wherein:
the second mapping table lists physical blocks represented by different block substitutes, to be looked up according to a block substitute index; and
by scanning entries of the second mapping table, the controller obtains a block substitute representing a target physical block.

20. The non-volatile memory control method as claimed in claim 17, wherein:
the second mapping table lists block substitutes representing different physical blocks, to be looked up according to a physical block index; and
by scanning entries of the second mapping table, the controller obtains a physical block represented by a target block substitute.

* * * * *